March 26, 1968  J. H. BECK  3,375,319
HIGH TEMPERATURE ELECTRICAL HEATING UNIT
Filed Nov. 22, 1965
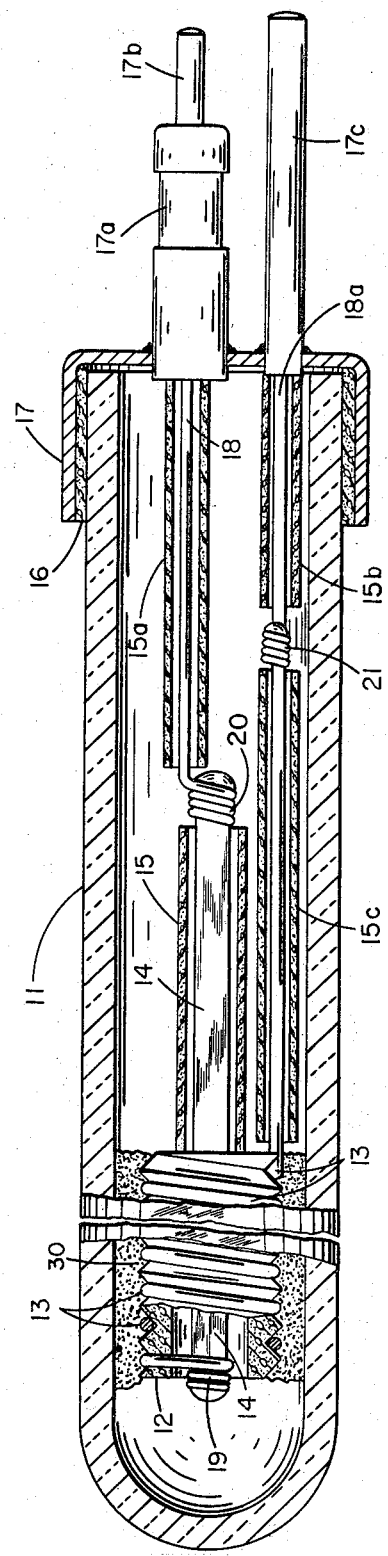
INVENTOR.
JACOB HOWARD BECK United States Patent Office 3,375,319
Patented Mar. 26, 1968

3,375,319
HIGH TEMPERATURE ELECTRICAL
HEATING UNIT
Jacob Howard Beck, Newton, Mass., assignor to BTU Engineering, Inc., Waltham, Mass., a corporation of Delaware
Filed Nov. 22, 1965, Ser. No. 509,137
5 Claims. (Cl. 13—25)

ABSTRACT OF THE DISCLOSURE

A long-life electrical heating unit is described which can be used in electrical diffusion furnaces at temperatures up to 1600° C. without the need of an inert atmosphere. The unit comprises an outer insulating tube non-porous to gas, a central electrically insulating tube porous to gas, a thin high resistance wire on the central tube and a thick low resistance lead made of metal of higher oxygen affinity than the wire metal.

This invention relates to improved electrical heating units, and in particular, to heating units useful in high temperature diffusion furnaces.

In electrical diffusion furnaces where the temperatures are quite high, such elevated temperatures often produce rapid deterioration of the heating units. Thus, an iron-chromium-aluminum wire which produces sufficient heat when wound around a ceramic cylinder will operate satisfactorily up to about 1300° C. However, if the temperature exceeds 1300° C., the wire itself begins to disintegrate. When higher melting metals such as tungsten or molybdenum are used as the heating element, higher temperatures can be obtained. However, in the case of tungsten or molybdenum it is necessary at such elevated temperatures to provide an inert atmosphere to prevent oxidation.

Thus, Lewin, U.S. 2,481,229 proposes the use of a tungsten or molybdenum coil which is purportedly isolated from any oxidizing or other gases. Singer, U.S. 2,207,558 also recognizes the fact that at 1400° C. and up there are attacks by oxygen on tungsten or molybdenum and attempts to solve the problem by making a ceramic gas-tight cover. Simiularly, Kerschbaum, U.S. 2,215,587 and Quain, U.S. 1,146,518 point out the necessity for an inert atmosphere. In actual practice, however, it is not only inconvenient to maintain an inert atmosphere, but it is difficult to find materials which can be used to provide and maintain an inert atmosphere around an electrical heating unit at the elevated temperatures involved.

Accordingly, one object of this invention is to provide a long-life electrical heating unit which can be operated at temperatures up to at least approximately 1600° C. without the need of an inert atmosphere.

Further objects and advantages of this invention will be apparent from the specification and claims which follow, taken together with the appended drawing which is a side view with partial cutaway showing one embodiment of this invention.

The novel, long-life high temperature electrical heating unit of this invention comprises generally a perforated central ceramic tube around which is wound a high melting, high resistance wire made of tungsten, molybdenum or the like. This wire wound tube is surrounding by a non-porous ceramic tube and provided with the customary seals. The electrical lead for the high resistance coil comprises a rod of relatively larger cross section and lower specific resistance than the wire. Either solid rod or bundle of wires can be used. The rod extends through the central tube and is made of a metal which has a higher affinity for oxygen than the metal from which the resistance coil is made. I prefer to use tantalum as the metal for the rod. Tantalum has a greater affinity for oxygen than either tungsten or molybdenum. The rod being substantially larger in cross section has a much lower resistance as compared with the thin tungsten or molybdenum wire and thus does not itself build up self-destroying heat. The oxygen which might be present adjacent to the resistance wire will diffuse through the pores of the inner or central ceramic tube and preferentially combine with the tantalum. Further, if the oxygen did combine with molybdenum, the resultant molybdenum oxide is also a gas which, however, combines with the solid tantalum to form a solid tantalum oxide.

Another feature of this invention is the optional use of a granular getter material between the outer and inner tubes. Thus, the space between the tubes can be filled with relatively coarse conductive particles, such as graphite, coated with smaller non-conductive particles, such as alumina. The alumina particles constitute a permeable coating permitting oxygen to penetrate and combine with the carbon of the graphite.

Referring now to the drawings, there is illustrated therein a single-ended electrical resistance heater suitable for use in a diffusion furnace. The unit comprises an outer housing or ceramic tube 11 which is normally gas-impervious. Spaced within this outer ceramic tube 11 is a gas-porous central ceramic tube 12 which has helical grooves on which is wound a relatively thin molybdenum high resistance wire 13. The outer ceramic housing 11 is sealed by a metal ceramic seal 16 to a metal end seal 17 through which protrude an insulated lead 17a and a metal lead 17c. Insulated lead 17a has a plug end 17b while lead 17c also has a plug end. Nickel lead wire 18 is connected to insulated lead 17a–b, is housed within the outer tube 11 and is surrounded by a ceramic sheath 15a. By means of weld 20 the lead wire 18 is connected to a long rod 14 which extends through the central tube 12 and covered by a ceramic sheath 15. The rod 14 is made of tantalum and is of relatively large cross section as compared with the resistance wire 13. The other end of the rod 14 is connected by a weld 19 to the molybdenum resistance wire 13. The other end of the resistance wire 13 has a portion covered by a ceramic sheath 15c and is joined by weld 21 to a nickel wire 18a. Nickel wire 18a, covered by ceramic sheath 15b, in connected to the metal lead 17c. This heating unit has a long life at a temperature of about 1600° C. Graphite particles coated with alumina, 30, are shown in the space between the tubes.

Although the heating unit illustrated in the drawing is single-ended, it can be double-ended, i.e., have leads coming from each end. The heating element can be of single or multiple zone construction.

I claim:

1. An electrical heating unit comprising a central refractory electrically insulating tube which is porous to gas at elevated temperatures, an outer refractory insulating tube which surrounds the central tube, is closed at one end, is hermetically sealed by an end seal at the other end, and is non-porous to gas at such elevated temperatures, a relatively thin, high resistance refractory wire wound around said central tube and having terminal wires extending outside the outer tube for connection to a source of electrical energy, and a relatively large cross section low resistance refractory rod extending through said central tube and acting as an electrical lead for said wire; said rod being characterized in that it is made of a metal which has a higher affinity for oxygen than the metal from which said wire is made.

2. The electrical heating unit of claim 1 wherein the space between the outer and inner tubes contains a mass of relatively coarse granules of a conductive material coated with relatively small particles of a non-conductive material.

3. The electrical heating unit of claim 1 wherein the wire is made of either tungsten or molybdenum and the rod is made of tantalum.

4. The electrical heating unit of claim 1 wherein the space between the inner and outer tubes contains a mass of relatively coarse granules of graphite coated with relatively small particles of alumina.

5. In an electrical heating unit wherein there is a central refractory insulating tube around which resistance wire is wound and an outer refractory insulating tube surrounding said inner tube, the improvement comprising providing within the space between the tubes a mass of relatively coarse granules of a conductive material coated with relatively small particles of non-conductive material.

References Cited

UNITED STATES PATENTS

| | | | |
|---|---|---|---|
| 2,372,212 | 3/1945 | Lewin | 338—237 |
| 2,481,229 | 9/1949 | Lewin | 338—237 |
| 2,902,578 | 9/1959 | Johnson et al. | 338—299 X |

RICHARD M. WOOD, *Primary Examiner.*